(12) United States Patent
Hori

(10) Patent No.: US 10,966,217 B2
(45) Date of Patent: Mar. 30, 2021

(54) WIRELESS BASE STATION, WIRELESS TERMINAL, WIRELESS COMMUNICATION SYSTEM, AND VOICE SIGNAL COMMUNICATION METHOD

(71) Applicant: Panasonic Intellectual Property Management Co., Ltd., Osaka (JP)

(72) Inventor: Takako Hori, Kanagawa (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/990,232

(22) Filed: May 25, 2018

(65) Prior Publication Data

US 2018/0279321 A1 Sep. 27, 2018

Related U.S. Application Data

(63) Continuation of application No. PCT/JP2016/003858, filed on Aug. 24, 2016.

(30) Foreign Application Priority Data

Dec. 11, 2015 (JP) .............................. JP2015-242375

(51) Int. Cl.
*H04W 72/04* (2009.01)
*H04W 72/10* (2009.01)
(Continued)

(52) U.S. Cl.
CPC ............. *H04W 72/10* (2013.01); *H04W 4/90* (2018.02); *H04W 28/02* (2013.01)

(58) Field of Classification Search
CPC ........ H04W 72/10; H04W 28/02; H04W 4/90
See application file for complete search history.

(56) References Cited

U.S. PATENT DOCUMENTS

| 6,898,195 B1 * | 5/2005 | Molno | H04W 76/28 370/329 |
| 7,233,595 B1 * | 6/2007 | Hollis | H04L 49/60 370/395.2 |

(Continued)

FOREIGN PATENT DOCUMENTS

| JP | 2010-502103 A | 1/2010 |
| JP | 2011-233989 A | 11/2011 |

(Continued)

OTHER PUBLICATIONS

3GPP TS 22.011 V14.0.0, "$3^{rd}$ Generation Partnership Project; Technical Specification Group Services and System Aspects; Service accessibility (Release 14)," Sep. 2015, 28 pages.

(Continued)

*Primary Examiner* — Hassan Kizou
*Assistant Examiner* — Mahbubul Bar Chowdhury
(74) *Attorney, Agent, or Firm* — Seed IP Law Group LLP

(57) ABSTRACT

A wireless base station includes a state-of-emergency determiner, a silent section detector, a priority level controller, a resource allocation request detector, and a resource controller. The state-of-emergency determiner determines a state of emergency. In a case of the state of emergency, the silent section detector detects a silent section for a downlink voice packet. In the case of the state of emergency, the priority level controller lowers a transmission priority level of a packet in the silent section for the downlink voice packet. In the case of the state of emergency, the resource allocation request detector detects a request for allocation of an uplink radio resource to a silent section for an uplink voice packet. In the case of the state of emergency, the resource controller lowers a priority level for the allocation of the uplink radio resource to the silent section for the uplink voice packet.

8 Claims, 5 Drawing Sheets

(51) Int. Cl.
*H04W 4/90* (2018.01)
*H04W 28/02* (2009.01)

(56) References Cited

U.S. PATENT DOCUMENTS

| | | | | |
|---|---|---|---|---|
| 7,359,979 | B2* | 4/2008 | Gentle | H04L 47/10 704/210 |
| 2008/0090583 | A1* | 4/2008 | Wang | H04W 72/121 455/452.1 |
| 2009/0154417 | A1* | 6/2009 | Wu | H04W 72/042 370/329 |
| 2010/0046451 | A1* | 2/2010 | Tada | H04W 4/10 370/329 |
| 2010/0135166 | A1* | 6/2010 | Ahluwalia | H04L 47/30 370/252 |
| 2013/0021965 | A1* | 1/2013 | Chu | H04W 4/10 370/328 |
| 2013/0040598 | A1* | 2/2013 | Kashiwase | H04W 72/0426 455/404.1 |
| 2013/0242741 | A1* | 9/2013 | Ozawa | H04M 3/367 370/235 |
| 2015/0351028 | A1* | 12/2015 | Vallath | H04L 65/607 370/311 |
| 2017/0064572 | A1* | 3/2017 | Subramanian | H04L 65/1063 |
| 2017/0289857 | A1* | 10/2017 | Bertze | H04W 36/245 |

FOREIGN PATENT DOCUMENTS

| | | |
|---|---|---|
| JP | 2015-142293 A | 8/2015 |
| WO | 2008/024283 A2 | 2/2008 |
| WO | 2012/077701 A1 | 6/2012 |

OTHER PUBLICATIONS

3GPP TS 23.203 V13.5.1, "3$^{rd}$ Generation Partnership Project; Technical Specification Group Services and System Aspects; Policy and charging control architecture (Release 13)," Sep. 2015, 243 pages.
3GPP TS 23.228 V13.4.0, "3$^{rd}$ Generation Partnership Project; Technical Specification Group Services and System Aspects; IP Multimedia Subsystem (IMS); Stage 2 (Release 13)," Sep. 2015, 314 pages.
3GPP TS 23.401 V13.4.0, "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 13)," Sep. 2015, 334 pages.
3GPP TS 26.071 V12.0.0, "3$^{rd}$ Generation Partnership Project; Technical Specification Group Services and System Aspects; Mandatory speech CODEC speech processing functions; AMR speech CODEC; General description (Release 12)," Sep. 2014, 12 pages.
3GPP TS 26.114 V13.1.0, "3$^{rd}$ Generation Partnership Project; Technical Specification Group Services and System Aspects; IP Multimedia Subsystem (IMS); Multimedia Telephony; Media handling and interaction (Release 13)," Sep. 2015, 327 pages.
3GPP TS 26.171 V12.0.0, "3$^{rd}$ Generation Partnership Project; Technical Specification Group Services and System Aspects; Speech codec speech processing functions; Adaptive Multi-Rate—Wideband (AMR-WB) speech codec; General description (Release 12)," Sep. 2014, 12 pages.
3GPP TS 26.441 V12.1.0, "3$^{rd}$ Generation Partnership Project; Technical Specification Group Services and System Aspects; Codec for Enhanced Voice Services (EVS); General Overview (Release 12)," Dec. 2014, 12 pages.
3GPP TS 36.321 V12.7.0, "3rd Generation Partnership Project; Technical Specification Group Radio Access Network; Evolved Universal Terrestrial Radio Access (E-UTRA); Medium Access Control (MAC) protocol specification (Release 12)," Sep. 2015, 77 pages.
3GPP TS 36.331 V12.7.0, "3$^{rd}$ Generation Partnership Project; Technical Specification Group Radio Access Network; Evolved Universal Terrestrial Radio Access (E-UTRA); Radio Resource Control (RRC); Protocol specification (Release 12)," Sep. 2015, 453 pages.
IETF RFC 4867, "RTP Payload Format and File Storage Format for the Adaptive Multi-Rate (AMR) and Adaptive Multi-Rate Wideband (AMR-WB) Audio Codecs," Apr. 2007, 59 pages.
International Search Report, dated Nov. 8, 2016, for the corresponding International Patent Application No. PCT/JP2016/003858, 2 pages.

* cited by examiner

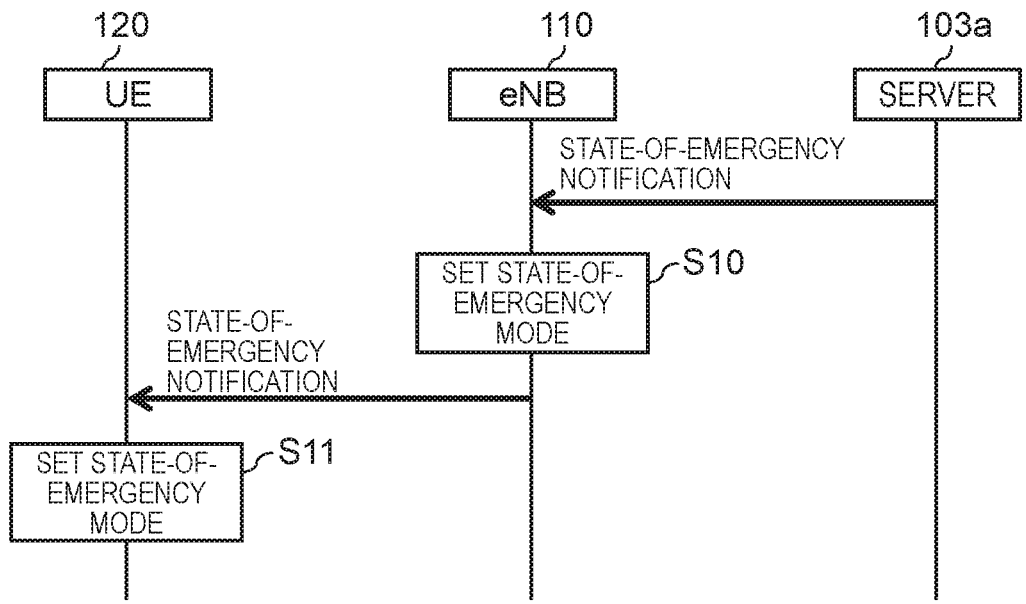
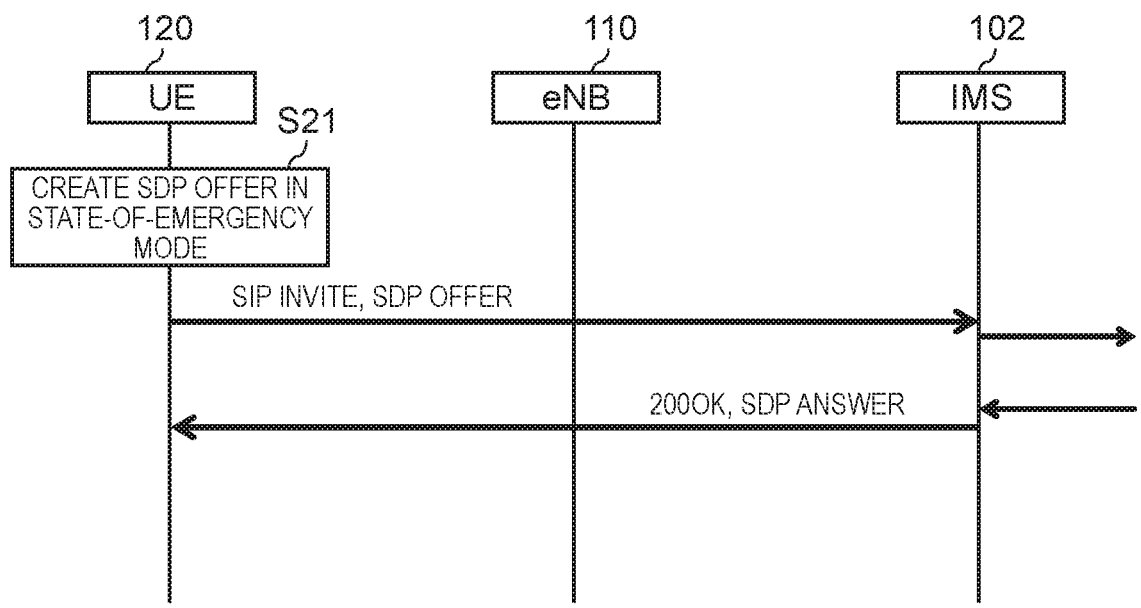

WIRELESS BASE STATION, WIRELESS TERMINAL, WIRELESS COMMUNICATION SYSTEM, AND VOICE SIGNAL COMMUNICATION METHOD

This application is a continuation application of the PCT International Application No. PCT/JP2016/003858 filed on Aug. 24, 2016, which claims the benefit of foreign priority of Japanese patent application 2015-242375 filed on Dec. 11, 2015, the contents all of which are incorporated herein by reference.

BACKGROUND

1. Technical Field

The present disclosure relates to a wireless base station, a wireless terminal, a wireless communication system, and a voice signal communication method that support Voice over Long Term Evolution (VoLTE).

2. Description of the Related Art

When a large scale disaster occurs such as an earthquake, many users use voice telephones to place calls that are destined for a disaster area in order to check whether or not people are safe. As a result, a state where a connection is difficult to make for communication is reached. Furthermore, when a network failure occurs, the state where the connection is difficult to make for communication is also reached. For this reason, when a state of emergency occurs, communication regulation is taken for the purpose of reducing traffic. For example, a technology relating to call regulation in the event of a disaster is disclosed Japanese Patent Unexamined Publication No. 2015-142293.

SUMMARY

The present disclosure is to provide an apparatus and a method that are capable of efficiently performing resource control by utilizing multi-rate codec features of VoLTE and thus performing congestion control while suppressing a decrease in the number of users that can be accommodated in the event of emergency.

A wireless base station according to an aspect of the present disclosure includes a state-of-emergency determiner, a silent section detector, a priority level controller, a resource allocation request detector, and a resource controller. The state-of-emergency determiner determines a state of emergency, and sets a state-of-emergency mode. In a case of the state of emergency, the silent section detector detects a silent section for a downlink voice packet. In the case of the state of emergency, the priority level controller lowers a transmission priority level of a packet in the silent section for the downlink voice packet. In the case of the state of emergency, the resource allocation request detector detects a request for allocation of an uplink radio resource to a silent section for an uplink voice packet. In the case of the state of emergency, the resource controller lowers a priority level for the allocation of the uplink radio resource to the silent section for the uplink voice packet.

A wireless terminal according to another aspect of the present disclosure includes a state-of-emergency determiner, a silent section detector, and an uplink resource requestor. The state-of-emergency determiner determines a state of emergency, and sets a state-of-emergency mode. In a case of the state of emergency, the silent section detector detects a silent section for an uplink voice packet. In the case of the state of emergency, the uplink resource requestor adds information indicating a voice packet in a silent section, to a request for allocation of an uplink resource to a wireless base station.

A wireless communication system according to a still another aspect of the present disclosure includes the wireless base station and the wireless terminal described above.

A voice signal communication method according to a still another aspect of the present disclosure is a voice signal communication method in a wireless base station that supports VoLTE. The voice signal communication method includes setting a state-of-emergency mode, detecting a silent section for a voice packet in the case of the state of emergency, and lowering a priority level of a packet in the silent section in the case of the state of emergency.

A voice signal communication method according to a still another aspect of the present disclosure is a voice signal communication method in a wireless base station that supports VoLTE. The voice signal communication method includes setting a state-of-emergency mode, detecting a request for allocation of an uplink radio resource to a silent section for an uplink voice packet in the case of the state of emergency, and lowering a priority level for the allocation of the uplink radio resource to the silent section for the uplink voice packet in a case of the state of emergency.

According to these generic or specific aspects, a system, an apparatus, a method, an integrated circuit, a computer program, or a recording medium may be realized, and any combination of a system, an apparatus, a method, an integrated circuit, a computer program, and a recording medium may be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating a procedure for setting a state-of-emergency mode;

FIG. 4 is a diagram illustrating a procedure for a call setting in the state-of-emergency mode;

DETAILED DESCRIPTION

Figure 1:
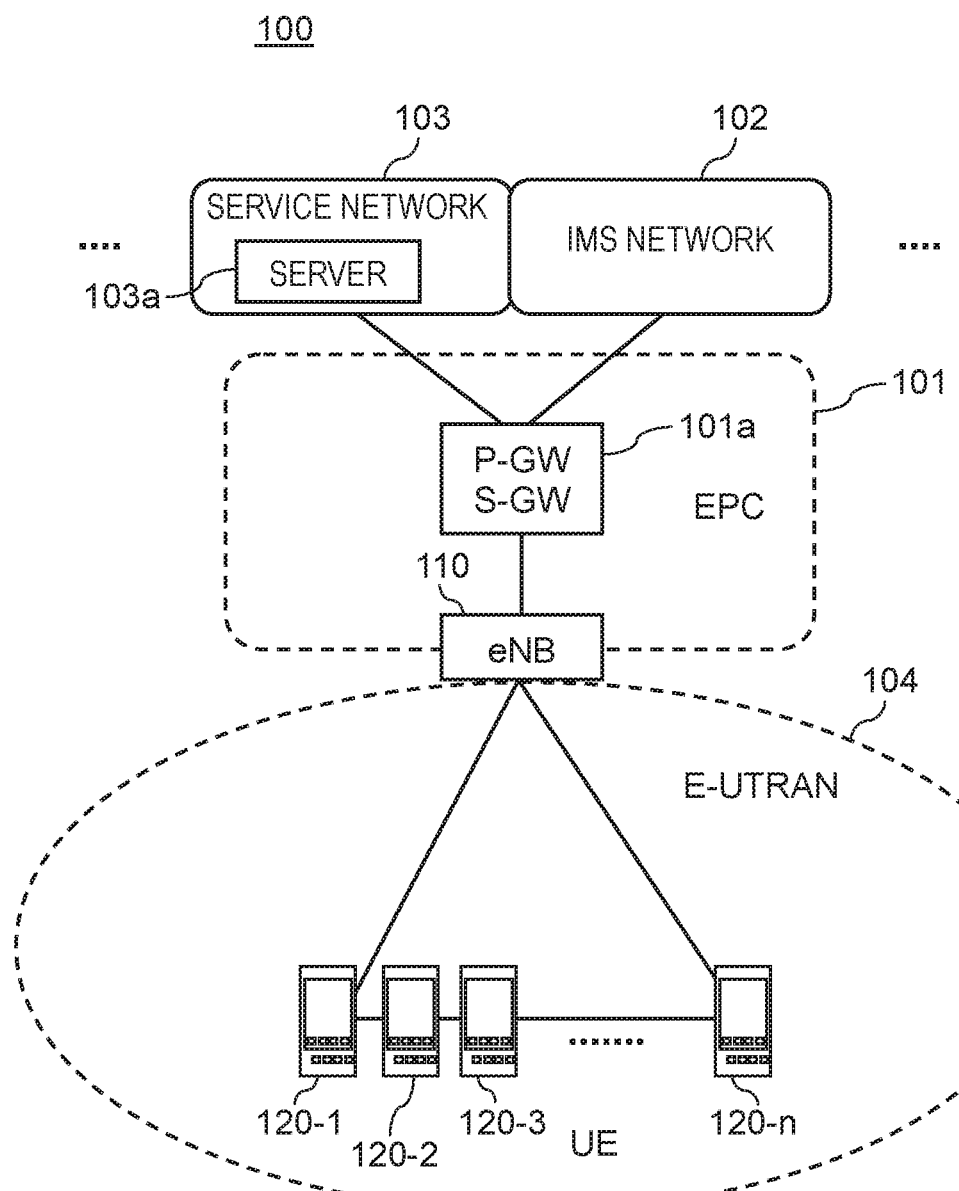
FIG. 1 is a diagram illustrating a configuration of a wireless communication system according to an embodiment.

Problems in the related art are briefly described before describing an embodiment according to the present disclosure. As is disclosed in Japanese Patent Unexamined Publication No. 2015-142293, implementing communication regulation with an assignment of a priority level to a call, would ensure communication for a user of a call having a high priority level. However, this also has a disadvantage that it would increase a probability that a user of a call having a low priority level may not perform communication.

Consequently, there is a need for a technology, when a state of emergency occurs, that can perform congestion control with minimum reduction in the number of users that can be accommodated.

The embodiment according to the present disclosure will be described in detail below with reference to the drawings.

(1) Principle

First, circumstances that brought about the present embodiment and a principle behind the present embodiment will be described.

In an LTE service, as specified in 3GPP TS 23.203, "Policy and charging control architecture, v13.5.1", a voice telephone conversation (VoLTE) packet that requires an end-to-end bidirectional real-time attribute is treated with a priority level next to that of an IMS signal that is a control signal of VoLTE, etc., except for a case of the Mission Critical service. In a case where a plurality of wireless terminals that make connections to the same E-UTRAN NodeB (eNB: Evolved Universal Terrestrial Radio Access Network (E-UTRAN) wireless base station) use a VoLTE service at the same time, the priority levels for the plurality of wireless terminals are treated equally by the eNB.

A discontinuous transmission (DTX) technology is supported by a voice codec for AMR (Adaptive Multi-Rate) (3GPP TS 26.071, "Mandatory speech CODEC speech processing functions; AMR speech Codec; General description, v12.0.0"), AMR-WB (Adaptive Multi-Rate Wideband) (3GPP TS 26.171, "Speech codec speech processing functions; Adaptive Multi-Rate-Wideband (AMR-WB) speech codec; General description, v12.0.0"), EVS (Enhanced Voice Services) (3GPP TS 26.441, "Codec for Enhanced Voice Services (EVS); General overview, v12.1.0"), and the like, which are used for VoLTE. With this technology, pseudo-data, the data amount of which is small, is sent while the user is not talking (in a silent section), and thus it can save a wireless band that is needed.

However, in a case where VoLTE is simultaneously used when the state of emergency occurs such as in the event of a disaster, in the eNB, a great number of voice packets needed to be treated at the same time, and it is difficult to treat all voice packets at the same priority level. Thus, in the present embodiment, a priority level of a packet in the silent section is lowered and thus allocation of a radio resource is efficiently performed. The packet in the silent section, of which the priority level is lowered, is discarded or is transmitted later than a packet in a voiced section.

Accordingly, the priority level of the packet in the voiced section is relatively raised, and a packet loss in the voiced section is suppressed. Thus, even in a case where VoLTE is used at a same time in the event of the disaster or the like, it can provide communication while suppressing quality degradation. Furthermore, one or several of the packets in the silent section are discarded, and thus it can increase the number of users that can be accommodated. More precisely, even in a case where traffic increases in the event of the disaster, it is possible to accommodate more users while suppressing degradation of Quality of Experience (QoE) in the communications.

Specifically, in downlink, for transmission, the eNB lowers a priority level of the voice packet in the silent section. Alternatively, one or several of the packets in the silent section are not transmitted. The reason is that even if the packet in the silent section experiences a loss, an influence of the loss on the QoE is small compared with that of a packet in the voiced section. Incidentally, the eNB can detect the packet in the silent section using a size of the packet and a transmission pattern of the packet. Specifically, a silence insertion descriptor (SID), an amount of whose data is approximately 56 bits, which indicates the silent section, is sent approximately one time per every eight frames. Between each of the SIDs, either no data is sent, or information of approximately 0 to several bits indicating "No Data" which includes no data is sent. With this pattern, the eNB can detect the silent section. For example, in a variable bit rate (VBR) mode of an EVS codec, although also in the voiced section, data whose size is the same as that of the SID is sent approximately one time per every several frames, in the silent section, there are differences in sizes of other frames or patterns of pieces of data having the same size as that of the SID. From this, the silent section is identifiable.

On the other hand, in uplink, user equipment (UE: a wireless terminal) transmits a buffer status report (BSR) added with information explicitly indicating that the BSR is for the silent section, which is a signaling with which a request for an uplink resource is made. BSR is specified in 3GPP TS 36.321, "Evolved Universal Terrestrial Radio Access (E-UTRA); Medium Access Control (MAC) protocol specification, v12.7.0". In indicating the BSR on the silent section explicitly, one of values 01100 to 10101 that are reserved, among logical channel identifiers (LCIDs) that are specified, for example, in Table 6.2.1-2 in the document (3GPP TS 36.321, "Evolved Universal Terrestrial Radio Access (E-UTRA): Medium Access Control (MAC) protocol specification, v12.7.0") is allocated as the BSR on the silent section. The eNB lowers the priority level for allocation of the uplink resource the BSR, or ignores the BSR. With information that is delivered from the encoder, the UE can detect the silent section (the SID or no-data).

Moreover, the UE creates a session description protocol (SDP) offer that is added to an IP multimedia subsystem (IMS) signaling which is transmitted when a call is newly originated, in such a manner that a voice codec for a low bit rate is used and transmits the created SDP offer to the UE which is a communication destination partner. For example, only 4.75 kbps that is the lowest rate of bit rates of an AMR codec, or only 6.6 kbps that is the lowest bit rate of bit rates of an AMR-WB codec, is described in the SDP offer. Accordingly, a telephone conversation at a low bit rate is possible. Furthermore, a codec for the SDP offer or an RTP payload format may be limited. For example, a codec that is offered is limited only to the AMR codec, and a payload format is also limited only to a bandwidth-efficient format of two payload formats that are specified in IETF RFC 4867, "RTP Payload Format and File Storage Format for the Adaptive Multi-Rate (AMR) and Adaptive Multi-Rate Wideband (AMR-WB) Audio Codecs". More precisely, among a plurality of items that are included in the SDP offer, only a minimum number of items is sent. Accordingly, the number of bits of the IMS signaling can be deceased, and the number of users that can be accommodated can be increased. Example of an SDP offer that is used in VoLTE and of an SDP offer that will be described below are specified in 3GPP TS 26.114, "IP Multimedia Subsystem (IMS); Multimedia telephony; Media handling and interaction, v13.1.0". A codec, a parameter, and the like that are to be described in the SDP offer at the normal time or in the event of emergency, and a codec, a parameter, and the like that are to be described in the SDP offer may be statically set in advance to be in software or in a chip within the UE, and may be dynamically set in order to support roaming and the like. In a case where the setting is dynamically performed, a codec or a parameter may be notified to the UE, for example, by a server or the like of an operator who provides the VoLTE service, and a code, a parameter, or the like may be notified as broadcast information from the eNB, or one of parameters of a signaling that is transmitted when establishing a connection to the eNB. Furthermore, the codec, the parameter, and the like that are set in each offer are stored within the UE. With operator information, such as a public land mobile network identifier (PLMN ID) or a mobile network code (MNC), which is obtained using the broadcast information from the eNB, the UE may determine an operation that is a connection destination, and may select a codec, a parameter, or the like that is to be described in the SDP.

In order to cause the eNB and the UE to switch to an operation that is to be performed when the state of emergency such as the disaster described above occurs, a notification of the state of emergency may be sent from a server or the like of the operator who provides the VoLTE service, to the eNB and the UE. Furthermore, the notification of the state of emergency may be sent by the server described above or the like only to the eNB, and may be notified by the eNB to the UE. Furthermore, a notification for causing the switching to the operation that is to be performed when the state of emergency occurs may be sent to not only the eNB and the UE but also nodes on other networks that constitute the VoLTE service.

(2) Configuration

FIG. 1 is a diagram illustrating an example of a configuration of a wireless communication system in which a voice signal communication method according to the present disclosure is performed. Because wireless communication system 100 in FIG. 1 is one that employs a general configuration for performing VoLTE, a description is provided briefly here. In wireless communication system 100, Evolved Packet Core (EPC) 101 as specified in 3GPP TS 23.401, "General Packet Radio Service (GPRS) enhancements for Evolved Universal Terrestrial Radio Access Network (E-UTRAN) access, v13.4.0", and IP multimedia subsystem (IMS) network 102 as specified in 3GPP TS 23.228, "IP Multimedia Subsystem (IMS); Stage 2, v13.4.0", cooperate with each other, and thus a voice call is placed. Evolved packet core (EPC) 101 is configured with a packet data network gate way (P-GW), a serving gate way (S-GW), or the like. Server 103a in service network 103 is a server of the operator who provides the VoLTE service described above. Emergency information or the like indicating the state of emergency is provided from server 103a to EPC 101. eNB 110 of Evolved Universal Terrestrial Access Network (E-UTRAN) 104 perform wireless communication with UE 120 (120-1, and so forth up to 120n) within a communication area of eNB 110 itself, in compliance with VoLTE.

Figure 2:
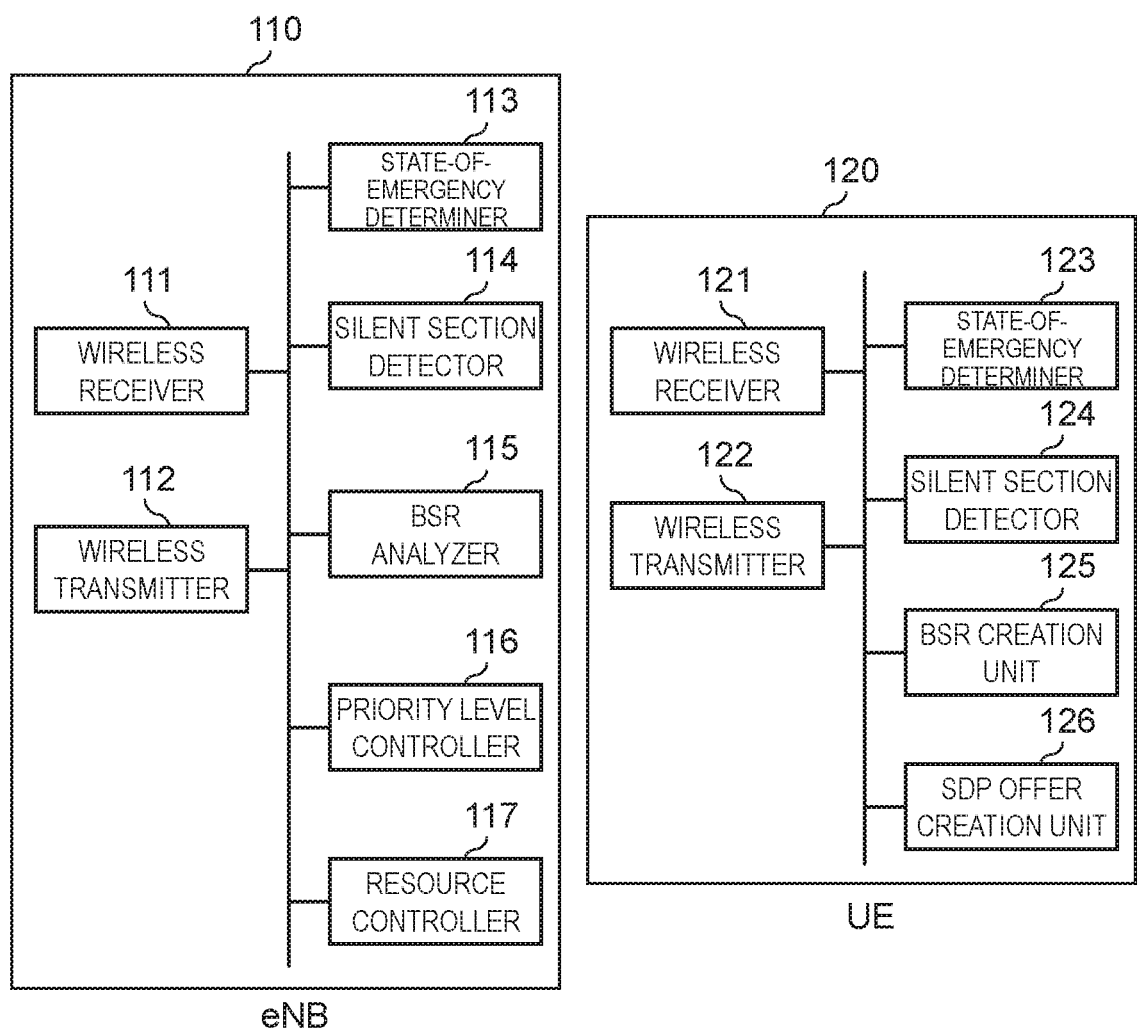
FIG. 2 is a diagram illustrating configurations of an eNB and UE according to the embodiment.

FIG. 2 illustrates configurations of eNB 110 (which corresponds to the "wireless base station" according to the present disclosure) according to the present embodiment, and UE 120 (which corresponds to the "wireless terminal" according to the present disclosure).

eNB 110 has a wireless receiver 111, a wireless transmitter 112, state-of-emergency determiner 113, silent section detector 114, buffer status report (BSR) analyzer 115, priority level controller 116, and resource controller 117.

State-of-emergency determiner 113 determines that a state of emergency occurs and sets a state-of-emergency mode. In a case of the state of emergency, silent section detector 114 detects the silent section for downlink voice packet. In the case of the state of emergency, priority level controller 116 lowers a transmission priority level of a packet in the silent section. In the case of the state of emergency, BSR analyzer 115 (which corresponds to a "resource allocation request detector" according to the present disclosure) detects a request for allocation of an uplink radio resource to a silent section for an uplink voice packet. In the case of the state of emergency, resource controller 117 lowers a priority level for the allocation of the uplink radio resource to the silent section for the uplink voice packet.

UE 120 has wireless receiver 121, wireless transmitter 122, state-of-emergency determiner 123, silent section detector 124, a buffer status report (BSR) creator 125 as an uplink resource requestor, and session description protocol (SDP) offer creator 126.

State-of-emergency determiner 123 determines the state of emergency and sets the state-of-emergency mode. In the state of emergency, silent section detector 124 detects the silent section for the uplink voice packet. In the state of emergency, the BSR creator 125 (which corresponds to an "uplink resource requestor" according to the present disclosure) adds information indicating a voice packet for the silent section to a request for the allocation of the uplink resource to the wireless base station.

FIG. 3 illustrates a procedure for setting the state-of-emergency mode according to the present embodiment. When the notification of the state of the emergency is transmitted from server 103a, in Step S10, eNB 110 determines the state of emergency using state-of-emergency determiner 113, and sets eNB 110 itself to switch to the state-of-emergency mode. Furthermore, eNB 110 notifies UE 120 of the state of emergency. When receiving the notification of the state of the emergency from eNB 110, in Step S11, UE 120 determines the state of emergency using the state-of-emergency determiner 123, and sets UE 120 itself to switch to the state-of-emergency mode. For the notification of the state of emergency to eNB 110 and UE 120, a system information block (SIB), as specified in 3GPP TS 23.228, "IP Multimedia Subsystem (IMS); Stage 2, v13.4.0", may be used, and a response message of the eNB that is received when the UE makes a connection request to the eNB may be sued. Furthermore, in a case of using the SIB, Earthquake AND Tsunami Warning System (ETWS) that is broadcast information may be used, and a specification for the notification of the state of emergency is not limited.

FIG. 4 is a procedure for a call setting in the state-of-emergency mode according to the present embodiment. In Step S21, SDP offer creator 126 of UE 120 creates an SDP offer in the state-of-emergency mode. Specifically, as described above, when in the state-of-emergency mode, SDP offer creator 126 creates an SDP offer in which a lower bit rate is described and in which the limited number of items is described, and thus lowers the number of bits of the IMS signaling and increases the number of users that can be accommodated. The SDP offer is sent to the UE which is the communication destination partner (not illustrated), with SIP INVITE that is the IMS signaling, via EPC 101 and IMS network 102. SDP offer creator 126 may create an SDP offer for which the bit rate is low and in which the number of items is limited. UE 120 receives a response (200 OK: a setting completion notification) to the IMS signaling and an SDP answer that is a response to the SDP offer, from the UE which is the communication destination partner, via IMS network 102 and EPC 101, and thus a call is set.

Figure 5:
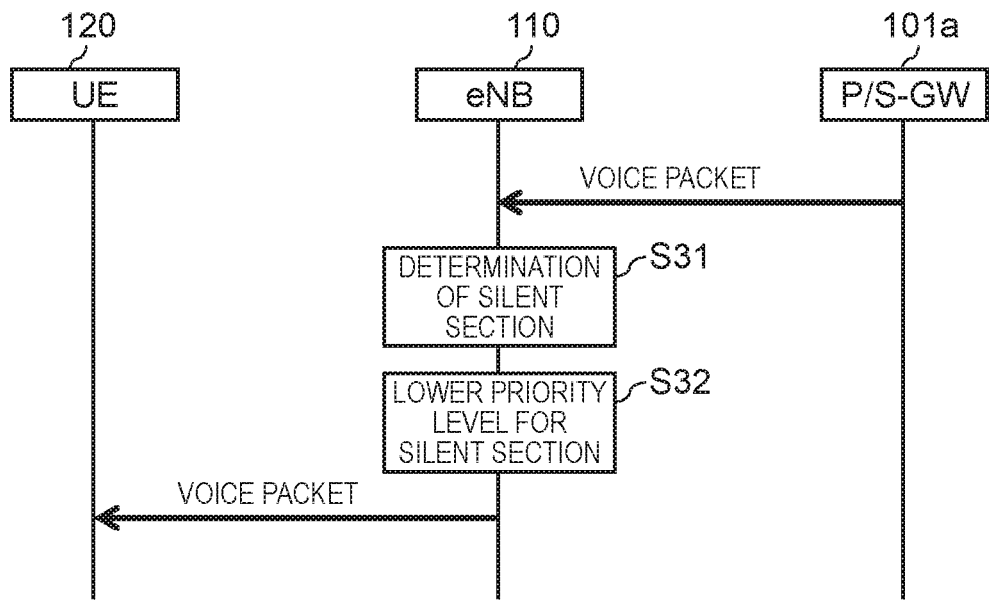
FIG. 5 is a diagram illustrating a procedure for processing a downlink voice packet in the state-of-emergency mode.

FIG. 5 illustrates a procedure for processing the downlink voice packet in the state-of-emergency mode according to the present embodiment. When receiving a voice packet via the P-GW and S-GW 101a, in Step S31, eNB 110 determines silent section using silent section detector 114. In Step S32, eNB 110 lowers a priority level of the voice packet in the silent section using priority level controller 116, and transmits the voice packet to UE 120.

Figure 6:
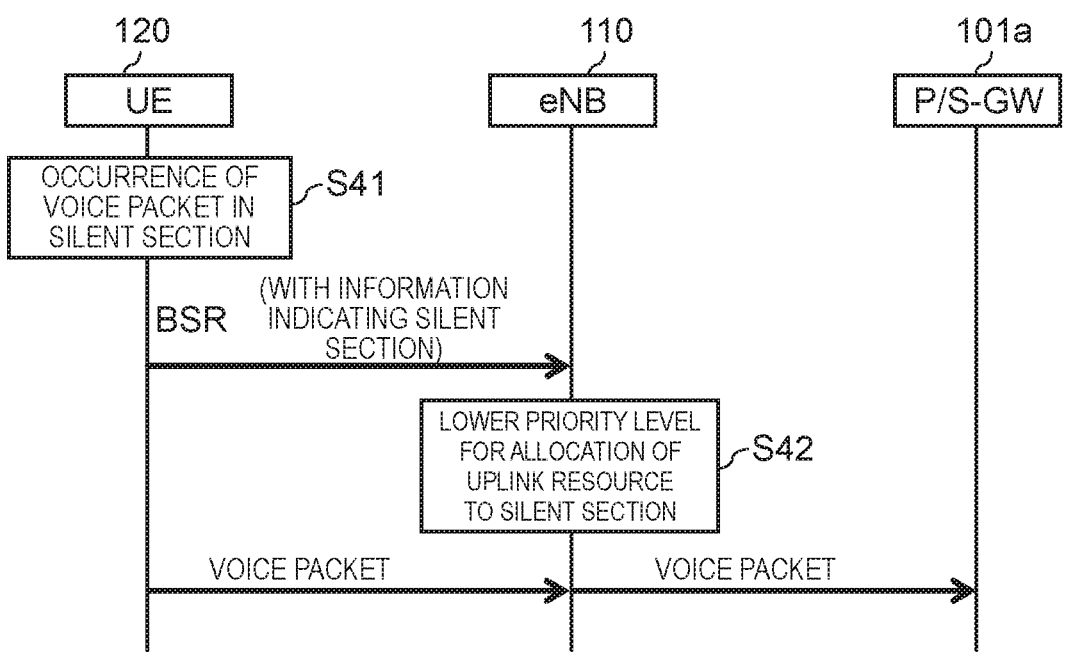
FIG. 6 is a diagram illustrating a procedure for processing an uplink voice packet in the state-of-emergency mode.

FIG. 6 illustrates a procedure for processing the uplink voice packet in the state-of-emergency mode according to the present embodiment. When UE 120 detects, using silent section detector 124, in Step S41 that the silent section occurs in the voice packet that is intended to be transmitted from UE 120 itself, UE 120 adds, using the BSR creator 125, information indicating explicitly the BSR is on the silent section to the BSR, and transmits, to eNB 110, the BSR to which the information indicating the silent section is added. eNB 110 receives and detects the BSR with information indicating silent section, and, in Step S42, lowers a priority level for allocating the uplink resource to the silent section using resource controller 117. When UE 120 transmits the voice packet, eNB 110 receives the voice packet from UE 120 at the priority level, and transmits the voice packet via S-GW and P-GW 101a.

Furthermore, in addition to what is described, UE in the state-of-emergency mode may change a jitter and buffer management in preparation for the packet in the silent section to arrive with delay or not to arrive. For example, a change is made such as increasing a size of a reception buffer.

As described above, according to the present embodiment, in a case where the state-of-emergency mode is possibly made to be set, and the silent section for the voice packet is detected in the event of the state-of-emergency mode, the priority levels for the transmission and the allocation of the packet in the silent section is lowered and thus congestion control can be performed while suppressing a decrease in the number of users that can be accommodated.

Figure 7:
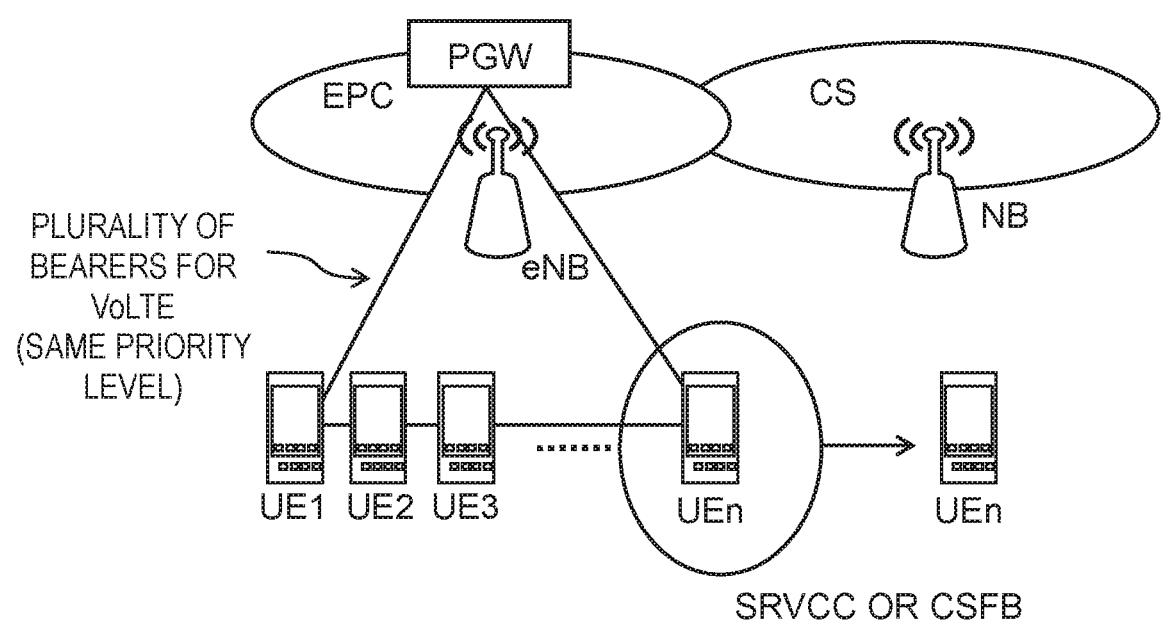
FIG. 7 is a diagram for describing another embodiment.

In addition to the embodiment described above, as illustrated in FIG. 7, in the event of the state-of-emergency mode, in a case where, although is a VoLTE terminal is used, there is congestion on the LTE side, if a CS network is set to be used for SRVCC (when a telephone conversation is in progress) or CSFB (when a call is originated and when a call arrives), the number of users that can be accommodated can be further increased. In this case, at the time of SRVCC, a terminal that can continue to use the same codec even on the CS network may be caused to be moved. Furthermore, in this case, the use of the state-of-emergency mode may be notified by server 103a to a node on a network that is involved in SRVCC or CSFB. Furthermore, the use of the state-of-emergency mode may be notified by server 103a directly to the UE, or through the eNB, and may be notified in such a manner that a call is originated in CSFB when the call is originated. For a method of the notification form the eNB to the UE, a system information block (SIB), as specified in 3GPP TS 23.228, "IP Multimedia Subsystem (IMS); Stage 2, v13.4.0", may be used, and the response message of the eNB that is received when the UE makes the connection request to the eNB may be sued. Furthermore, in the case of using the SIB, Earthquake AND Tsunami Warning System (ETWS) that is broadcast information may be used, and the specification for the notification of the state of emergency is not limited.

Furthermore, in addition to the embodiment described above, in the event of the state-of-emergency mode, two or three frames may be collectively sent on a per-RTP payload basis. When this is done, because the number of headers at the head of the frames can be decreased, the number of users that can be accommodated can be further increased.

The present embodiment is not limited to VoLTE, and may be adapted to voice services such as Voice over Internet Protocol (VoIP), group call, and push-to-talk.

Furthermore, in the present embodiment, Access Class Barring (ACB), Service Specific Access Control (SSAC), Smart Congestion Mitigation (SCM), and the like, which are existing congestion control technologies as specified in 3GPP TS 22.011, "Service accessibility, v14.0.0", may be used in combination.

Furthermore, in the embodiment described above, as an example, a case where, according to an aspect of the present disclosure, a hardware configuration is provided, but it is also possible that the present disclosure is realized in software in cooperation with hardware.

Each of the functional blocks described in the embodiment is achieved by an LSI, which is typically an integrated circuit. The integrated circuit may control each functional block that is used for describing the embodiment above, and may include an input and an output. The functional block may be provided as an individual chip, or some or all of the functional blocks may be provided as integrated in a single chip. Reference to the LSI is made here, but depending on the degree of integration, reference to an IC, a system LSI, a super LSI, or an ultra LSI is also made.

In addition, the circuit integration is not limited to the LSI and may be achieved by dedicated circuitry or a general-purpose processor. For example, a field programmable gate array (FPGA) in which programming is possible after fabrication of the LSI may be used as well; or a reconfigurable processor in which reconfiguration of connections and settings of circuit cells after fabrication of the LSI are possible within the LSI may be used as well.

Moreover, if a circuit integration technology that brings about a substitute for the LSI appears as a result of advances in a semiconductor technology or of other technologies that derive from the semiconductor technology, of course, integration of the functional blocks may be performed using such a technology. There can be a likelihood of a biotechnology and the like.

The embodiment described above is only an example of the specification in implementing the present disclosure, and this is not intended to limit the technical scope of the present disclosure. That is, the present disclosure can be implemented in various forms in a range that does not depart from the gist or the principal feature of the present disclosure.

A wireless base station according to the present disclosure includes a state-of-emergency determiner, a silent section detector, a priority level controller, a resource allocation request detector, and a resource controller. The state-of-emergency determiner determines a state of emergency, and sets a state-of-emergency mode. In a case of the state of emergency, the silent section detector detects a silent section for a downlink voice packet. In the case of the state of emergency, the priority level controller lowers a transmission priority level of a packet in the silent section for the downlink voice packet. In the case of the state of emergency, the resource allocation request detector detects a request for allocation of an uplink radio resource to a silent section for an uplink voice packet. In the case of the state of emergency, the resource controller lowers a priority level for the allocation of the uplink radio resource to the silent section for the uplink voice packet.

Furthermore, in the wireless base station according to the present disclosure, the priority level controller employs a configuration in which the packet in the silent section is prevented from being transmitted.

Furthermore, in the wireless base station according to the present disclosure, the resource controller employs a configuration in which the allocation of the radio resource to the silent section for the uplink voice packet is ignored.

A wireless terminal according to the present disclosure includes a state-of-emergency determiner, a silent section detector, and an uplink resource requestor. The state-of-emergency determiner determines a state of emergency, and sets a state-of-emergency mode. In a case of the state of emergency, the silent section detector detects a silent section for an uplink voice packet. In the case of the state of emergency, the uplink resource requestor adds information indicating a voice packet in a silent section, to a request for allocation of an uplink resource to a wireless base station.

Furthermore, the wireless terminal according to the present disclosure employs a configuration that includes a session description protocol (SDP) offer creator that, in the case of the state of emergency, creates an SDP offer in which a described bit rate is lower than a bit rate described in a case of a state of non-emergency.

A wireless communication system according to the present disclosure employs a configuration that includes the wireless base station described above and the wireless terminal described above.

A voice signal communication method according to the present disclosure is a voice signal communication method in a wireless base station that supports VoLTE. The voice signal communication method includes setting a state-of-emergency mode, detecting a silent section for a voice packet in the case of the state of emergency, and lowering a priority level of a packet in the silent section in a case of the state of emergency.

A voice signal communication method according to the present disclosure is a voice signal communication method in a wireless base station that supports VoLTE. The voice signal communication method includes setting a state-of-emergency mode, detecting a request for allocation of an uplink radio resource to a silent section for an uplink voice packet in the case of the state of emergency, and lowering a priority level for the allocation of the uplink radio resource to the silent section for the uplink voice packet in a case of the state of emergency.

Apparatuses, a system, and a method according to the present disclosure are useful as a wireless base station and a wireless terminal, a wireless communication system, and a voice signal communication method, respectively, which supports VoLTE.

What is claimed is:

1. A wireless base station comprising:
   a controller configured to:
   determine a state of emergency and set a state-of-emergency mode;
   detect a silent section for a downlink voice packet in a case of the state of emergency by identifying two silence insertion descriptors (SIDs) in different frames, and based on identifying the two SIDs in the different frames, determine that the silent section is between the two SIDs, wherein SIDs are transmitted every predetermined number of frames;
   lower a transmission priority level for a packet in the silent section for the downlink voice packet in the case of the state of emergency;
   receive, from a wireless terminal, a transmission buffer status report including silent section information, wherein the wireless terminal increases a size of a reception buffer in the case of the state of emergency;
   detect, based on the transmission buffer status report, a request for allocation of an uplink radio resource to a silent section for an uplink voice packet in the case of the state of emergency; and
   lower a priority level for the allocation of the uplink radio resource to the silent section for the uplink voice packet in the case of the state of emergency.

2. The wireless base station of claim 1, wherein the controller is configured to prevent the packet in the silent section for the downlink voice packet from being transmitted.

3. The wireless base station of claim 2, wherein the controller is configured to ignore the allocation of the radio resource to the silent section for the uplink voice packet.

4. The wireless base station of claim 1, wherein the controller is configured to ignore the allocation of the radio resource to the silent section for the uplink voice packet.

5. A wireless terminal comprising:
   a controller configured to:
   determine a state of emergency and set a state-of-emergency mode;
   increases a size of a reception buffer in the case of the state of emergency;
   detect a silent section for an uplink voice packet in a case of the state of emergency;
   add information indicating a voice packet in the silent section, a silent section for a downlink voice packet is detected in the case of the state of emergency by identifying two silence insertion descriptors (SIDs) in different frames, wherein the silent section is determined to be between the two SIDs, and wherein SIDs are transmitted every predetermined number of frames; and
   request for allocation of an uplink resource to a wireless base station in the case of the state of emergency by transmitting a transmission buffer status report that includes silent section information.

6. The wireless terminal of claim 5, wherein the controller is configured to:
   in the case of the state of emergency, create a session description protocol (SDP) offer in which a described bit rate is lower than a bit rate described in a case of a state of non-emergency.

7. A voice signal communication method in a wireless base station that supports Voice over Long Term Evolution (VoLTE), the method comprising:
   setting a state-of-emergency mode;
   detecting a silent section for a voice packet in a case of a state of emergency by identifying two silence insertion descriptors (SIDs) in different frames, wherein SIDs are transmitted every predetermined number of frames;
   based on identifying the two SIDs in the different frames, determining that the silent section is between the two SIDs;
   lowering a priority level of a packet in the silent section in the case of the state of emergency;
   receiving, from a wireless terminal, a transmission buffer status report including silent section information, wherein the wireless terminal increases a size of a reception buffer in the case of the state of emergency;
   detecting, based on the transmission buffer status report, a request for allocation of an uplink radio resource to the silent section for an uplink voice packet in the case of the state of emergency; and
   lowering a priority level for the allocation of the uplink radio resource to the silent section for the uplink voice packet in the case of the state of emergency.

8. A voice signal communication method in a wireless base station that supports Voice over Long Term Evolution (VoLTE), comprising:
- setting a state-of-emergency mode;
- receiving, from a wireless terminal, a transmission buffer status report including silent section information;
- detecting, based on the transmission buffer status report, a request for allocation of an uplink radio resource to a silent section for an uplink voice packet in a case of a state of emergency, wherein the wireless terminal increases a size of a reception buffer in the case of the state of emergency; and
- lowering a priority level for the allocation of the uplink radio resource to the silent section of the uplink voice packet in the case of the state of emergency, a silent section for a downlink voice packet is detected in the case of the state of emergency by identifying two silence insertion descriptors (SIDs) in different frames, wherein the silent section is determined to be between the two SIDs, and wherein SIDs are transmitted every predetermined number of frames.

* * * * *